Oct. 30, 1928.
R. C. CHARLTON
SAW HANDLE
Filed Dec. 8, 1926
1,690,054
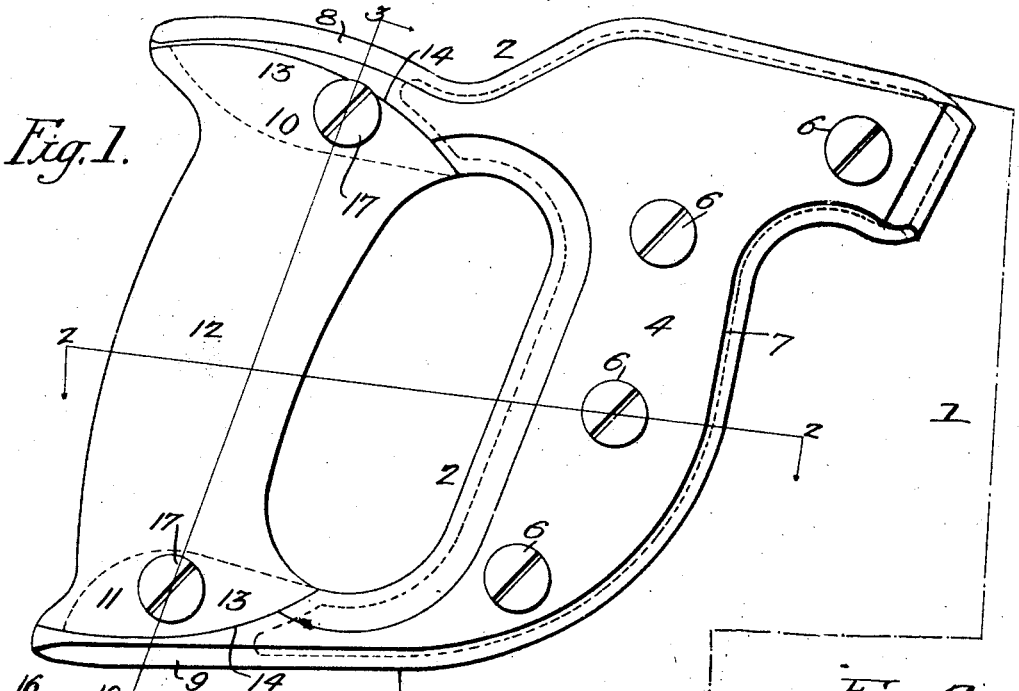
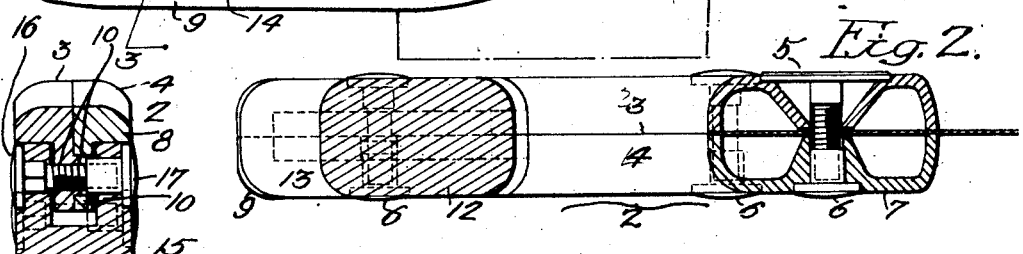
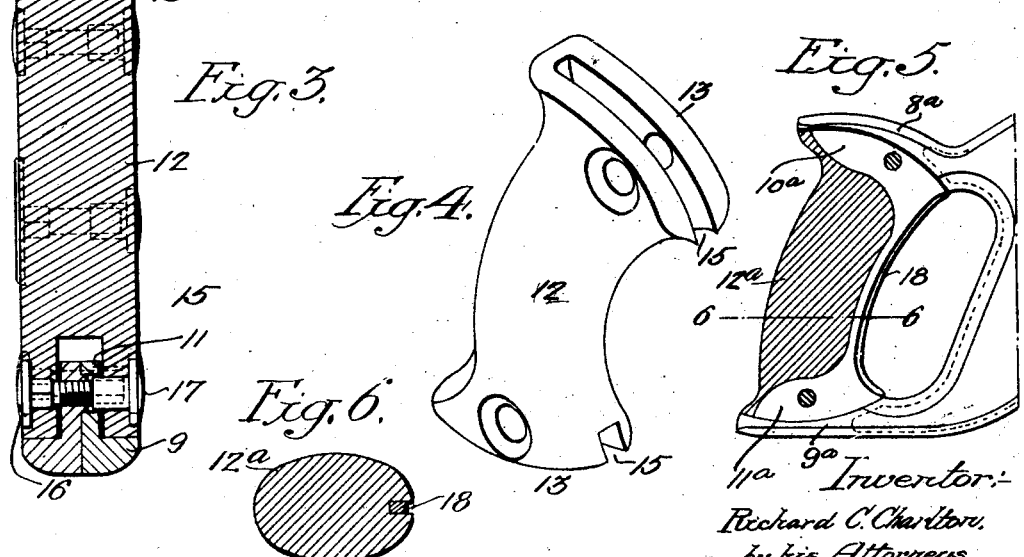
Inventor:
Richard C. Charlton,
by his Attorneys.
Howson & Howson Patented Oct. 30, 1928.

1,690,054

UNITED STATES PATENT OFFICE.

RICHARD C. CHARLTON, OF PHILADELPHIA, PENNSYLVANIA, ASSIGNOR TO HENRY DISSTON & SONS, INCORPORATED, OF PHILADELPHIA, PENNSYLVANIA, A CORPORATION OF PENNSYLVANIA.

SAW HANDLE.

Application filed December 8, 1926. Serial No. 153,338.

The object of my invention is to make a handle for a hand saw of metal, such as aluminum, having a hand-grip of wood or a composition which does not chill the hand.

In the accompanying drawing:

Fig. 1 is a side view of a handle of a hand-saw illustrating my invention;

Fig. 2 is a sectional view on the line 2—2, Fig. 1;

Fig. 3 is a sectional view on the line 3—3, Fig. 1;

Fig. 4 is a detached perspective view of the hand-grip;

Fig. 5 is a sectional view illustrating a modification; and

Fig. 6 is a sectional view on the line 6—6, Fig. 5.

The saw-blade 1 is of the ordinary type. The handle 2 is made in two parts 3 and 4, secured together and to the blade 1 by screw-bolts 5 of the form usually used in hand-saws. The bolts have heads countersunk in one side of the handle and are adapted to nuts 6 having heads countersunk in the opposite side of the handle.

The body portion 7 of the handle is hollow, as shown by dotted lines in Fig. 1 and in the sectional view, Fig. 2.

Projecting from the rear of the body portion 7 are upper and lower horns 8 and 9, which have tongues 10 and 11, respectively. A portion of each tongue is on each section of the handle, and a projection on one portion extends into the enlarged bolt-opening in the other section, keeping the two sections in alignment.

The hand-grip 12 is shaped to fit the hand as shown in Figs. 1 and 4, and is enlarged at each end 13 so as to protect the hand from the metallic horns 8 and 9 of the handle, each end being curved to fit the curved surfaces 14 of the horns. The ends of the hand-grip are slotted as at 15 to receive the tongues 10 and 11 of the horns.

The hand-grip and the tongues are perforated for the passage of the bolts 16, which are threaded and adapted to engage with nuts 17. The holes in the hand-grip are countersunk, so that the heads of the bolts and nuts are flush with the surface of the hand-grip as shown in Fig. 3.

The body portion of the handle is preferably made of aluminum or other comparatively light metal which will have sufficient strength to resist the rough treatment to which a hand-saw handle is subjected.

The hand-grip is preferably made of wood, but it may be made of a composition which will be strong and which will not chill the hand.

The horns 8 and 9 are shaped to resist any reasonable blows when a saw is dropped, as well as to protect the wooden hand-grip. If for any reason the wooden hand-grip should break, it can be readily detached and another substituted for it.

In some instances, the two horns 8ª and 9ª may be connected by a thin web 18, forming a continuation of the tongues 10ª and 11ª, Figs. 5 and 6. In this construction, the metal of the web would preferably stop short of the surface of the wooden hand-grip 12ª to prevent the hand coming in contact with the metal.

I claim:—

1. The combination in a handle for hand-saws, of a body portion made in two parts secured together and to a saw-blade, each part being made of metal and being hollow; upper and lower horns projecting rearwardly from the body portion and having tongues; a hand-grip located between the two horns and slotted at each end to receive the tongues; and transverse screws extending through each end of the hand-grip and through the two-part tongues, clamping the parts firmly together.

2. The combination in a hand-saw handle, of a body portion of metal made in two parts, each part being hollow and having upper and lower rearwardly extending portions forming horns, the inner surface of each horn being curved, the horns having perforated tongues; a hand-grip of material such as wood located between the two horns and shaped to fit the curved surfaces of the horns and slotted to receive the tongues; screw-bolts extending through the hand-grip and the tongues; and screw-bolts clamping the two parts of the body together.

RICHARD C. CHARLTON.